US010062007B2

(12) United States Patent
Nagato et al.

(10) Patent No.: US 10,062,007 B2
(45) Date of Patent: Aug. 28, 2018

(54) APPARATUS AND METHOD FOR CREATING AN IMAGE RECOGNIZING PROGRAM HAVING HIGH POSITIONAL RECOGNITION ACCURACY

(71) Applicant: FUJITSU LIMITED, Kawasaki-shi, Kanagawa (JP)

(72) Inventors: Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 15/171,416

(22) Filed: Jun. 2, 2016

(65) Prior Publication Data

US 2016/0379088 A1  Dec. 29, 2016

(30) Foreign Application Priority Data

Jun. 26, 2015  (JP) ................. 2015-128263

(51) Int. Cl.
G06K 9/62  (2006.01)
(52) U.S. Cl.
CPC ......... *G06K 9/6217* (2013.01); *G06K 9/6202* (2013.01); *G06K 9/6215* (2013.01); *G06K 9/6229* (2013.01)
(58) Field of Classification Search
CPC .. G06K 9/6202; G06K 9/6203; G06K 9/6229; G06K 9/6215; G06K 9/6217; G06K 9/62
USPC .......... 382/209, 216, 217, 218, 103
See application file for complete search history.

(56) References Cited

U.S. PATENT DOCUMENTS

2010/0290700 A1* 11/2010 Yokono ............. G06K 9/00369
382/159
2015/0199583 A1 7/2015 Nagatomo et al.

FOREIGN PATENT DOCUMENTS

JP  2009-151371  7/2009
JP  2014-26521  2/2014

OTHER PUBLICATIONS

Bhanu, Bir, Yingqiang Lin, and Krzysztof Krawiec. Evolutionary synthesis of pattern recognition systems. New York: Springer, 2005.*
Crispin, A. J., and V. Rankov. "Automated inspection of PCB components using a genetic algorithm template-matching approach." The International Journal of Advanced Manufacturing Technology 35.3-4 (2007): 293-300.*
(Continued)

*Primary Examiner* — Geoffrey E Summers

(57) ABSTRACT

An apparatus stores a plurality of partial programs, which are constituent elements of an image recognizing program that detects a position of a template image on an input image. The apparatus creates a plurality of individual programs each being a combination of at least two of the plurality of partial programs, and calculates a similarity map that associates similarity with the template image with each pixel of the input image by using each of the plurality of individual programs. The apparatus calculates fitness for each of the plurality of individual programs, based on a distribution of the similarity map, selects an individual program for which the fitness is equal to or greater than a prescribed threshold, from among the plurality of individual programs, and outputs the selected individual program as the image recognizing program.

8 Claims, 17 Drawing Sheets

(56) References Cited

OTHER PUBLICATIONS

Katz, A. J., and P. R. Thrift. "Generating image filters for target recognition by genetic learning." IEEE Transactions on Pattern Analysis and Machine Intelligence 16.9 (1994): 906-910.*

Oechsle, Olly. Towards the automatic construction of machine vision systems using genetic programming. Diss. University of Essex, 2009.*

Zhang, Mengjie, and Victor Ciesielski. "Genetic programming for multiple class object detection." Australian Joint Conference on Artificial Intelligence. vol. 1747. 1999.*

Zhang, Mengjie, and Malcolm Lett. "Genetic Programming for Object Detection: Improving Fitness Functions and Optimising Training Data." IEEE Intelligent Informatics Bulletin 7.1 (2006): 12-21.*

S. Aoki and T. Nagao, "ACTIT: Automatic Construction of Tree-structural Image Transformations", *The Journal of The Institute of Image Information and Television Engineers*, vol. 53, No. 6, Jun. 20, 1999, p. 888-894.

* cited by examiner

| ELEMENT NAME | NUMBER OF INPUTS |
|---|---|
| SMOOTHING FILTER | 1 |
| SOBEL FILTER | 1 |
| LAPLACIAN FILTER | 1 |
| TONE REVERSING FILTER | 1 |
| DIFFERENTIAL FILTER | 2 |
| TOTALING FILTER | 2 |
| ABSOLUTE DIFFERENCE FILTER | 2 |
| THRESHOLD PROCESSING FILTER | 1 |
| EDGE DETECTING FILTER | 1 |
| NO-CHANGE FILTER | 1 |
| MATCHING | 2 |
| INPUT TERMINAL I1 | - |
| INPUT TERMINAL I2 | - |
| OUTPUT TERMINAL O1 | - |

FIG. 6
RELATED ART
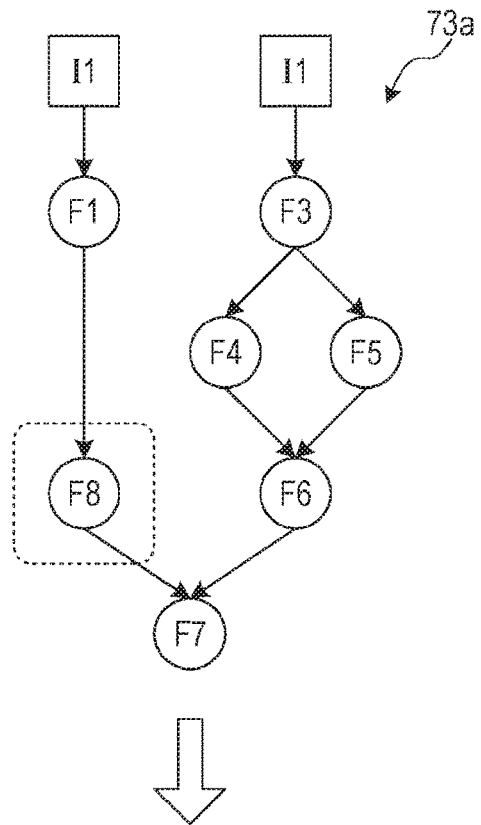
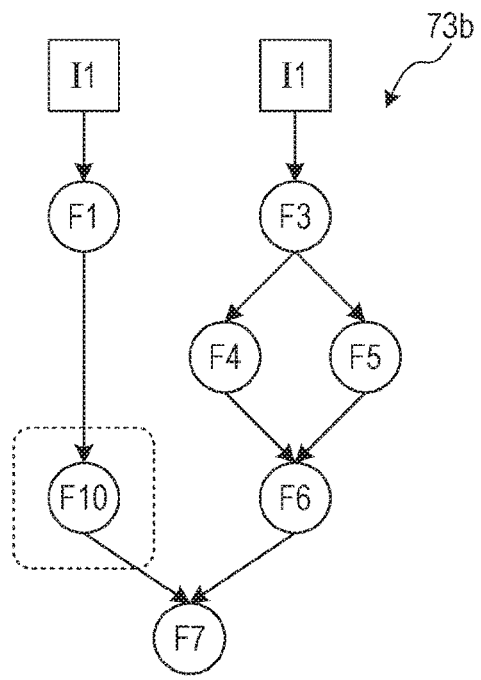

APPARATUS AND METHOD FOR CREATING AN IMAGE RECOGNIZING PROGRAM HAVING HIGH POSITIONAL RECOGNITION ACCURACY

CROSS-REFERENCE TO RELATED APPLICATION

This application is based upon and claims the benefit of priority of the prior Japanese Patent Application No. 2015-128263, filed on Jun. 26, 2015, the entire contents of which are incorporated herein by reference.

FIELD

The embodiments discussed herein are related to an apparatus and method for creating an image recognizing program having high positional recognition accuracy.

BACKGROUND

A technology is attracting attention that automatically creates, by genetic programming, an image processing program that executes desired image processing. In this technology, an image processing program is created by combining partial programs (image filter programs, for example) used for image processing, after which the created image processing program is optimized by genetic programming in which an input image and a processing result (a target image, for example) taken as a target are used. An example of related art is described in Shinya Aoki, Tomoharu Nagao "Automatic Construction of Tree-structural Image Transformations (ACTIT)" *The Journal of The Institute of Image Information and Television Engineers*, Vol. 53, No. 6, p. 889-892, Jun. 20, 1999.

As an example of an apparatus that uses genetic programming, Japanese Laid-open Patent Publication No. 2009-151371 proposes an image processing apparatus that creates an image processing procedure by which a desired processing result is obtained. With this image processing apparatus, the user only has to specify part of the area of an image to be processed and to create a target image on which image processing desired by the user has been performed in the specified area.

As another example, Japanese Laid-open Patent Publication No. 2014-26521 proposes a technology with which a feature value extraction method used in template matching is learned by genetic programming.

SUMMARY

According to an aspect of the invention, an apparatus stores a plurality of partial programs, which are constituent elements of an image recognizing program that detects a position of a template image on an input image. The apparatus creates a plurality of individual programs each being a combination of at least two of the plurality of partial programs, and calculates a similarity map that associates similarity with the template image with each pixel of the input image by using each of the plurality of individual programs. The apparatus calculates fitness for each of the plurality of individual programs, based on a distribution of the similarity map, selects an individual program for which the fitness is equal to or greater than a prescribed threshold, from among the plurality of individual programs, and outputs the selected individual program as the image recognizing program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of elements that are able to be included in an individual program;

FIG. 6 is a diagram illustrating an example of a mutation;

DESCRIPTION OF EMBODIMENTS

As an example of an image processing program, an image recognizing program used to detect the position of a template image on an input image may be automatically created by genetic programming. In this case, an input image and the correct position of the template image on the input image are used as learning data. Since an output in image recognition processing is the position of the template image on the input image, a method is possible in which an algorithm is evaluated in the middle of learning according to error between the position of the template on the input image and the correct position of the template image. However, when an algorithm is evaluated through a comparison of positions alone, large variations occur in precision of recognized positions, depending on the input image.

In one aspect, it is desirable to provide an apparatus and method that may create an image recognizing program that highly precisely recognizes positions.

Embodiments of the present disclosure will be described with reference to the drawings.

First Embodiment

Figure 1:
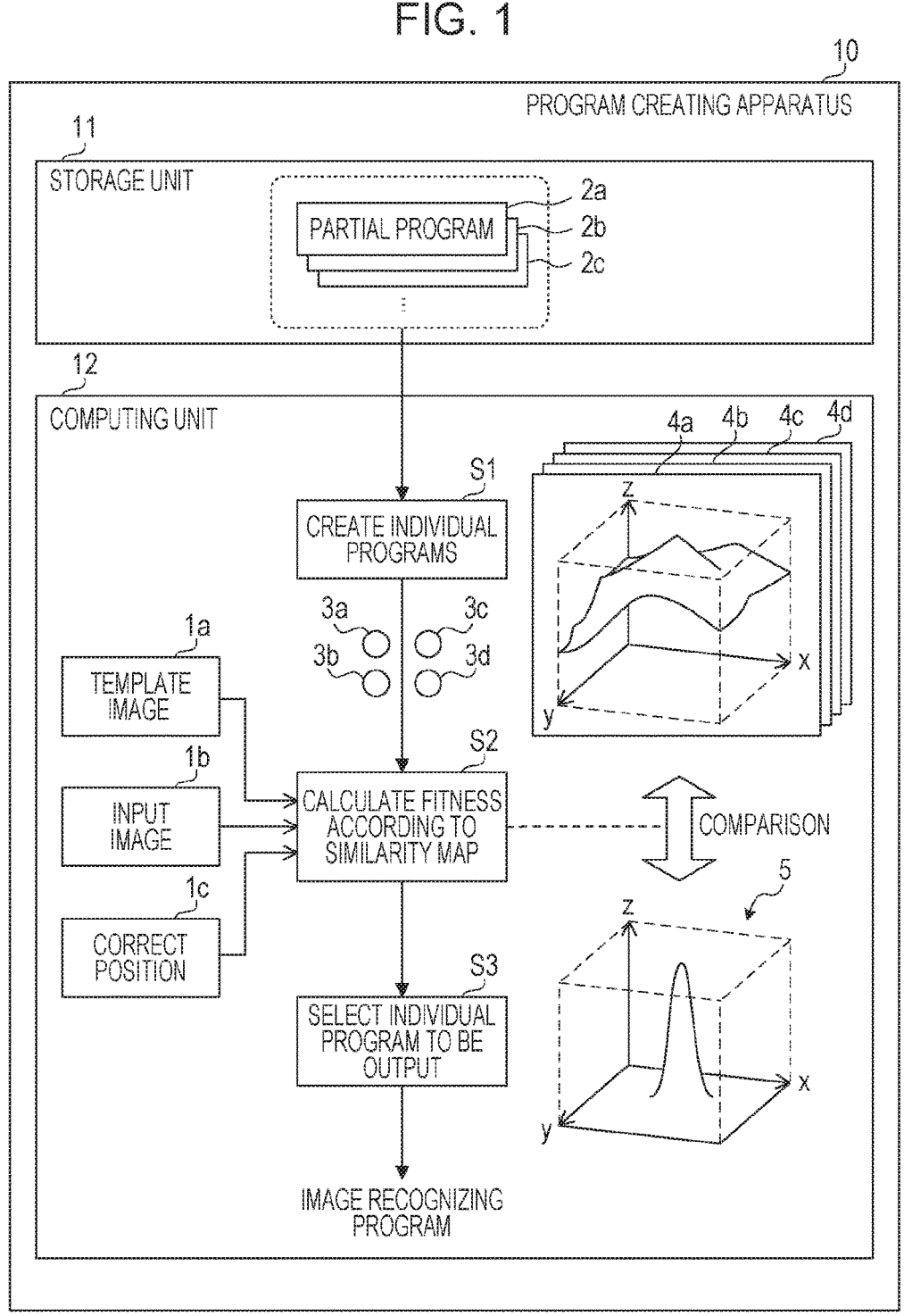
FIG. 1 is a diagram illustrating an example of a configuration of a program creating apparatus and processing executed thereby, according to an embodiment.

FIG. 1 illustrates an example of the structure of a program creating apparatus according to a first embodiment and an example of processing executed by the program creating apparatus. A program creating apparatus 10 illustrated in FIG. 1 creates, by genetic programming, an image recognizing program that detects the position of a template image 1a included in an image.

The program creating apparatus 10 includes a storage unit 11 and a computing unit 12. The storage unit 11 is implemented as for example, a volatile storage device such as a random-access memory (RAM) or a non-volatile storage device such as a hard disk drive (HDD) or a flash memory. The computing unit 12 is, for example, a processor.

The storage unit 11 stores a plurality of partial programs 2a, 2b, 2c, . . . , which are elements constituting an image recognizing program. These partial programs are, for example, various image filters used in preprocessing of template matching.

The computing unit 12 create a plurality of individual programs 3a to 3d, each of which is a combination of at least two of these partial programs 2a, 2b, 2c, . . . (step S1). That is, the individual programs 3a to 3d are programs each of which is created by combining partial programs. This individual program creation processing includes, for example, a procedure described below.

The computing unit 12 makes combinations each of which includes at least two of the partial programs 2a, 2b, 2c, . . . to create an individual program group including many individual programs. The individual program group may include only initial individual programs, which are first created by the computing unit 12. Alternatively, the individual programs in the individual program group may be formed by replacing some of the initial individual programs with individual programs selected for survival (selected as those to be left). The computing unit 12 selects a certain number of parent individual programs from the individual program group. The computing unit 12 also creates child individual programs by performing prescribed evolution processing on selected parents individual program.

When the procedure described above is executed, the individual programs 3a to 3d are created. The individual programs 3a to 3d may include only child individual programs or may be a combination of child individual programs and parent individual programs.

Next, the computing unit 12 calculates similarity maps 4a to 4d for the created individual programs 3a to 3d, respectively, and calculates fitness for each of the individual programs 3a to 3d, according to the corresponding one of the similarity maps 4a to 4d (step S2). In similarity map calculation, the template image 1a, an input image 1b, and the correct position 1c of the template image 1a on the input image 1b are used. A similarity map is created by a procedure described below.

The computing unit 12 uses the individual program 3a to execute detection processing to detect the position of the template image 1a on the input image 1b. During this detection processing, the computing unit 12 calculates a similarity map corresponding to the individual program 3a. The similarity map is information in which each pixel on the input image 1b is associated with similarity with the template image 1a. The computing unit 12 may not execute the above detection processing to its end; it suffices for the computing unit 12 to execute the detection processing only until a similarity map has been calculated. The similarity maps 4b to 4d corresponding to the individual programs 3b to 3d may also be calculated by the same procedure.

Fitness is calculated according to a distribution of each of the similarity maps 4a to 4d. As the shape of the distribution of the similarity map approaches the shape of a target distribution, fitness is increased. For example, fitness is calculated by comparing the distribution of each of the similarity maps 4a to 4d with a target distribution 5. The target distribution 5 illustrated in FIG. 1 has a shape in which a peak is formed at the correct position 1c on the input image 1b and similarity is lowered as the distance from the peak is prolonged. An example of this type of distribution is a normal distribution having a peak at the correct position 1c.

Next, the computing unit 12 selects an individual program having fitness equal to or greater than a prescribed threshold from among the individual programs 3a to 3d, and outputs the selected individual program as the image recognizing program (step S3). When the individual programs 3a to 3d includes no individual program for which fitness is equal to or greater than the prescribed threshold, the computing unit 12 may select an individual program to be left for survival from the individual programs 3a to 3d according to fitness and may replace part of the above individual program group with the selected individual program.

In the processing described above, the program creating apparatus 10 calculates fitness for each of the individual programs 3a to 3d according to the distributions of the similarity maps 4a to 4d, which are respectively based on the individual programs 3a to 3d. The program creating apparatus 10 then outputs a final image recognizing program according to the fitness of each of the individual programs 3a to 3d. Thus, it is possible to create an image recognizing program with high detection precision for the position of the template image 1a.

During a learning process in genetic programming, the distributions of similarity maps may take various shapes and a difference in these shapes may affect precision in fitness calculation, that is, precision in the evaluation of the individual programs 3a to 3d. The program creating apparatus 10 is able to improve precision in fitness calculation by calculating fitness according to the degree of correctness of the distribution of the similarity map. As a result, the program creating apparatus 10 may create a highly precise image recognizing program.

For example, the distribution of a similarity map during the learning process may take a shape in which a plurality of peaks having similarities close to one another appear. In a distribution having this type of shape, even if the peak at the correct position 1c has the maximum similarity among a plurality of peaks, when the input image varies due to, for example, a change in an environment at the time of photographing, a peak at a position other than the correct position 1c may have the maximum similarity, in which case an incorrect position may be detected. That is, the robustness of an individual program resulting in a similarity map having a shape as described above is low.

In, for example, a method of calculating the fitness of each of the individual programs 3a to 3d according to error alone between the correct position 1c and the position at which similarity is maximized, it is difficult to evaluate robustness as described above. For this reason, the fitness of an individual program with low robustness may be evaluated as high and, as a result, an image recognizing program with low position detection precision may be created. However, the program creating apparatus 10 may calculate fitness based on correctly evaluated robustness by using similarity map distributions, so the above problem may be mitigated.

Second Embodiment

Before a second embodiment is described, a comparative example indicating a basic procedure for creating an image recognizing program by genetic programming will be first described below with reference to FIGS. 2 to 6, after which problems with the comparative examples will be described with reference to FIGS. 7 and 8. Then, an image processing apparatus in the second embodiment will be described. In both the comparative example and the second embodiment, a created image recognizing program is used to execute template matching processing to detect the position of a template image on an input image.

Figure 2:
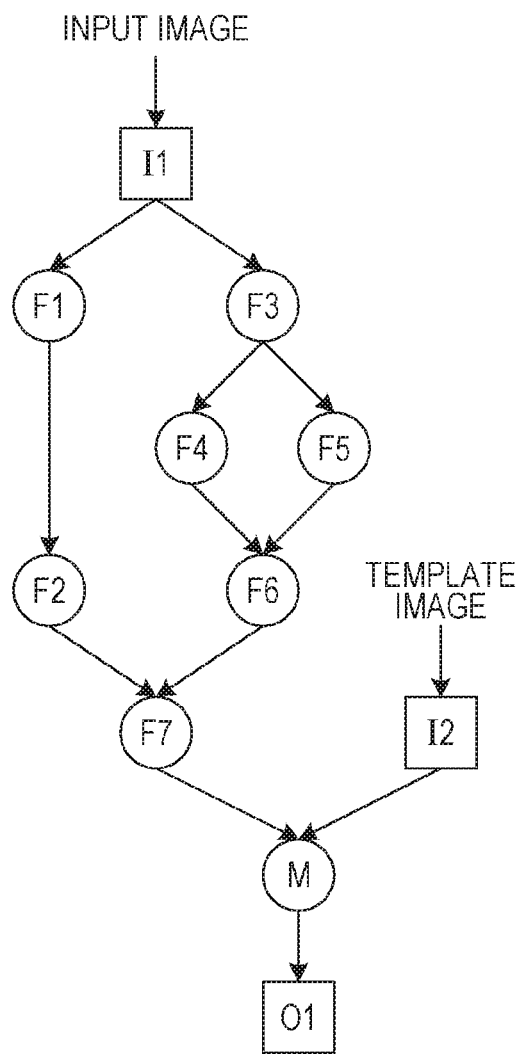
FIG. 2 is a diagram illustrating an example of an individual program.

FIG. 2 illustrates an example of an individual program. In genetic programming, an individual program group including a plurality of individual programs is created first. Individual programs created first are referred to as initial individual programs. Each individual program is an image processing program in which a plurality of partial programs are combined.

To implement template matching processing, each individual program is structured by using elements that are two input terminals I1 and I2, an output terminal O1, and a plurality of partial programs, as illustrated in FIG. 2. The input terminal I1 accepts an input image that is searched for the position of a template image. The input terminal I2 accepts the template image. The output terminal O1 outputs the position of the template image on the input image.

Each individual program includes a partial program M, which executes matching processing, and at least one partial program that executes other processing. In the description below, an image filter is used as an example of a partial program that executes other processing. The individual program illustrated in FIG. 2 includes image filters F1 to F7.

Initial individual programs are defined as a tree structure, in which relation between two nodes is represented by an arrow indicating a data flow from lower one of the two nodes to upper one of the two nodes. In the example in FIG. 2, one output from the image filter F3 is connected to the image filter F4 and another output from the image filter F3 is connected to the image filter F5. In practice, however, outputs from the two image filters F3 are connected to the image filters F4 and F5, respectively, so as to form a tree structure.

An initial individual program is created according further to a rule described below. An output from the partial program M, which executes matching processing, is connected to the input of the output terminal O1. The partial program M has a first input and a second input. An output from the input terminal I2 is connected to the second input of the partial program M. At least one image filter is placed between the input terminal I1 and the first input of the partial program M.

Image filters placed between the input terminal I1 and the first input of the partial program M (image filters F1 to F7 in the example in FIG. 2) execute preprocessing of the template matching processing. In this preprocessing, an input image is edited so as to fit to processing executed by the partial program M. An example of this processing is to extract feature value from the input image. The partial program M scans an image entered from the first input and calculates, for each area centered at each pixel on the image, similarity between the area and a template image sent from the input terminal I2 and received at the second input. As a matching result, the coordinates of the pixel corresponding to the area having the maximum similarity are output from the output terminal O1. In the description below, the coordinates output as a matching result may be referred to as the matching position.

FIG. 3 indicates examples of elements that are able to be included in an individual program. Of the elements indicated in a table 40 in FIG. 3, a smoothing filter, a Sobel filter, a Laplacian filter, a tone reversing filter, a differential filter, a totaling filter, an absolute difference filter, a threshold processing filter, an edge detecting filter, and a no-change filter are examples of image filters that are able to be included in an individual program. The no-change filter is a filter that does not perform any processing on the input image.

When an initial individual program is created, image filters to be included in the initial individual programs are selected from image filters prepared in advance as indicated in the table 40. In a case as well in which a mutation occurs during an evolution process described later, image filters to be substituted are selected from image filters prepared in advance as indicated in the table 40.

Figure 4:
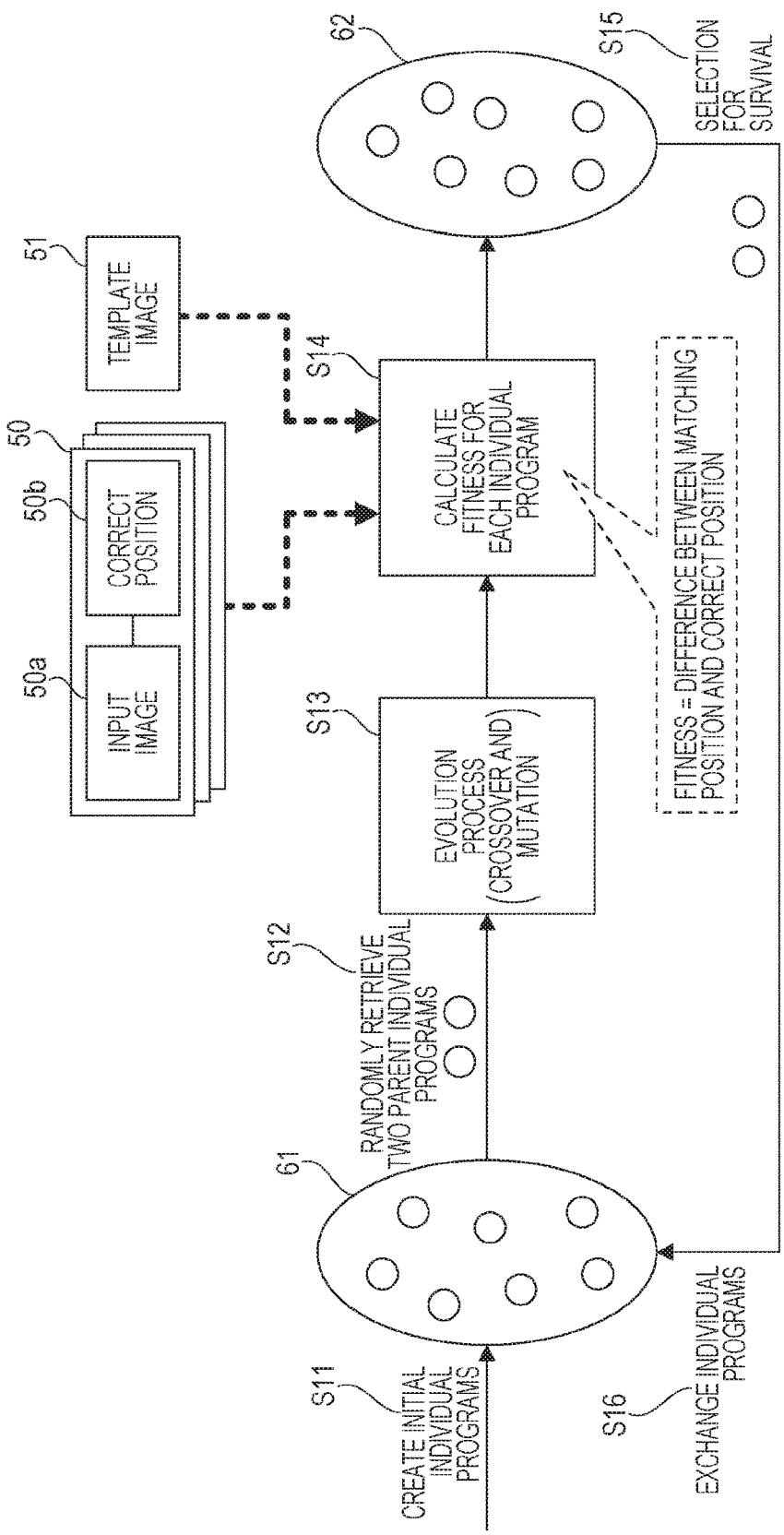
FIG. 4 is a diagram illustrating a comparative example of a creation processing procedure for creating an image recognizing program.

FIG. 4 illustrates a comparative example of a creation processing procedure for creating an image recognizing program. At least one piece of learning data 50 and a template image 51 are prepared before image recognizing program creation processing is executed. The learning data 50 includes an input image 50a, a correct position 50b of the template image 51 on the input image 50a. The input image 50a is obtained by, for example, taking a picture of a subject with a camera.

Image recognizing program creation processing by genetic programming is executed, for example, as described below. First, an individual program group 61 including a plurality of initial individual programs is created (step S11). Image filters are randomly selected from a plurality of image filters prepared in advance as described above, and the selected image filters are included in initial individual program nodes under the first input of the partial program M, which executes matching processing. Then, two parent individual programs are randomly retrieved from a created individual program group 61 (step S12).

Next, processing in the evolution process is performed on the two parent individual programs, creating at least two child individual programs (step S13). In the evolution process, crossover processing and mutation processing are performed on the two parent individual programs. Three or more child individual programs may be created by performing different crossover processing and different mutation processing on the two parent individual programs.

Next, fitness is calculated for each of the child individual programs created through the evolution process and for their original parent individual programs (step S14). In this processing, template matching processing in which each individual program to be processed is used, is executed on the input image 50a included in the learning data 50 to calculate fitness indicating the correctness of a processing result. The processing result is the position (matching position) of the template image 51 on the input image 50a. An example of a fitness calculation method is to calculate a difference between the calculated matching position and the correct position 50b. When there are a plurality of pieces of learning data 50, fitness values obtained from all input images 50a included in the plurality of pieces of learning data 50 are averaged for each individual program.

When the fitness of any one individual program is equal to or greater than the prescribed threshold, the individual program is output as a final image recognizing program, terminating the program creation processing. When the fitness values of all individual programs are smaller than the prescribed threshold, selection for survival is performed for an individual program group 62 including the created child individual programs and their original two parent individual programs (step S15). In this selection for survival, the individual program having the maximum calculated fitness is selected from the individual program group 62. In addition, one individual program is selected from the individual programs remaining in the individual program group 62 by a prescribed method. For example, an individual program is selected from the remaining individual programs with a probability matching the fitness.

The two individual programs selected through selection for survival as described above are substituted for the two individual programs retrieved as parent individual programs from the individual programs included in the individual program group 61 (step S16). Thus, the individual programs included in the individual program group 61 are changed to individual programs in a next generation. The same processing is repeated until an individual program with fitness equal to or greater than the prescribed threshold appears.

Figure 5:
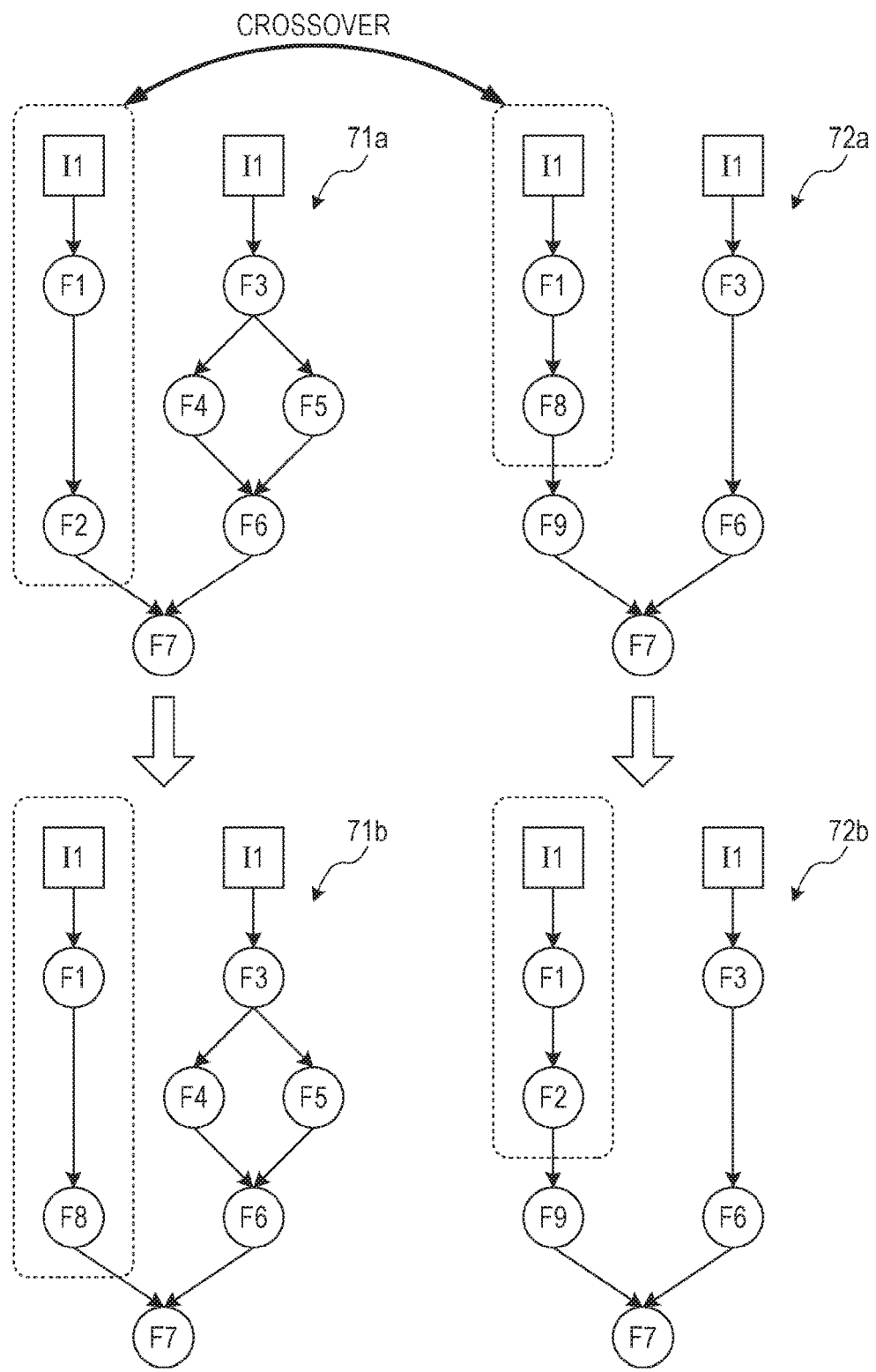
FIG. 5 is a diagram illustrating an example of a crossover.

FIG. 5 illustrates an example of a crossover. In the example in FIG. 5, a crossover occurs between a parent individual program 71a and a parent individual program 72a, a child individual program 71b is created from the parent individual program 71a, and a child individual program 72b is created from the parent individual program 72a. In FIG. 5, the input terminal I2, output terminal O1, and partial program M, which are connected at predetermined positions, are not illustrated in each individual program.

The parent individual program 71a includes image filters F1 to F7, and the parent individual program 72a includes image filters F1, F3, F6, F7, F8, and F9. It will be assumed here that the image filter F2 in the parent individual program 71a and the image filter F8 in the parent individual program 72a are selected as nodes at which a crossover is made.

In crossover processing, not only the selected nodes but also nodes below the selected nodes in the tree structure undergo a crossover. In the example in FIG. 5, therefore, the image filters F2 and F1 and the input terminal I1 in the parent individual program 71a, and the image filters F8 and F1 and the input terminal I1 in the parent individual program 72a are replaced with each other. In this crossover, the child individual program 71b including the image filters F1 and F3 to F8, and the child individual program 72b including the image filters F1 to F3, F6, F7, and F9 are created.

FIG. 6 illustrates an example of a mutation. In FIG. 6, an individual program 73a includes image filters F1 and F3 to F8. The individual program 73a may be a parent individual program retrieved from the individual program group 61. Alternatively, the individual program 73a may be an individual program obtained by retrieving an individual program from the individual program group 61 as a parent individual program and making a crossover on the retrieved individual program.

It will be assumed here that the image filter F8 in the individual program 73a is selected as a node at which a mutation occurs and an image filter F10 is selected as an image filter to be substituted due to the mutation. As a result of this mutation, an individual program 73b including the image filters F1, F3 to F7, and F10 is created. The image filter to be substituted due to the mutation is randomly selected from a plurality of image filters prepared in advance.

When an image recognizing program is to be created, as fitness of each individual program, a difference between the correct position and the matching position calculated according to the individual program may be used as described above with reference to FIG. 4. If fitness of this type is used, however, an image recognizing program with low robustness may be created.

Figure 7:
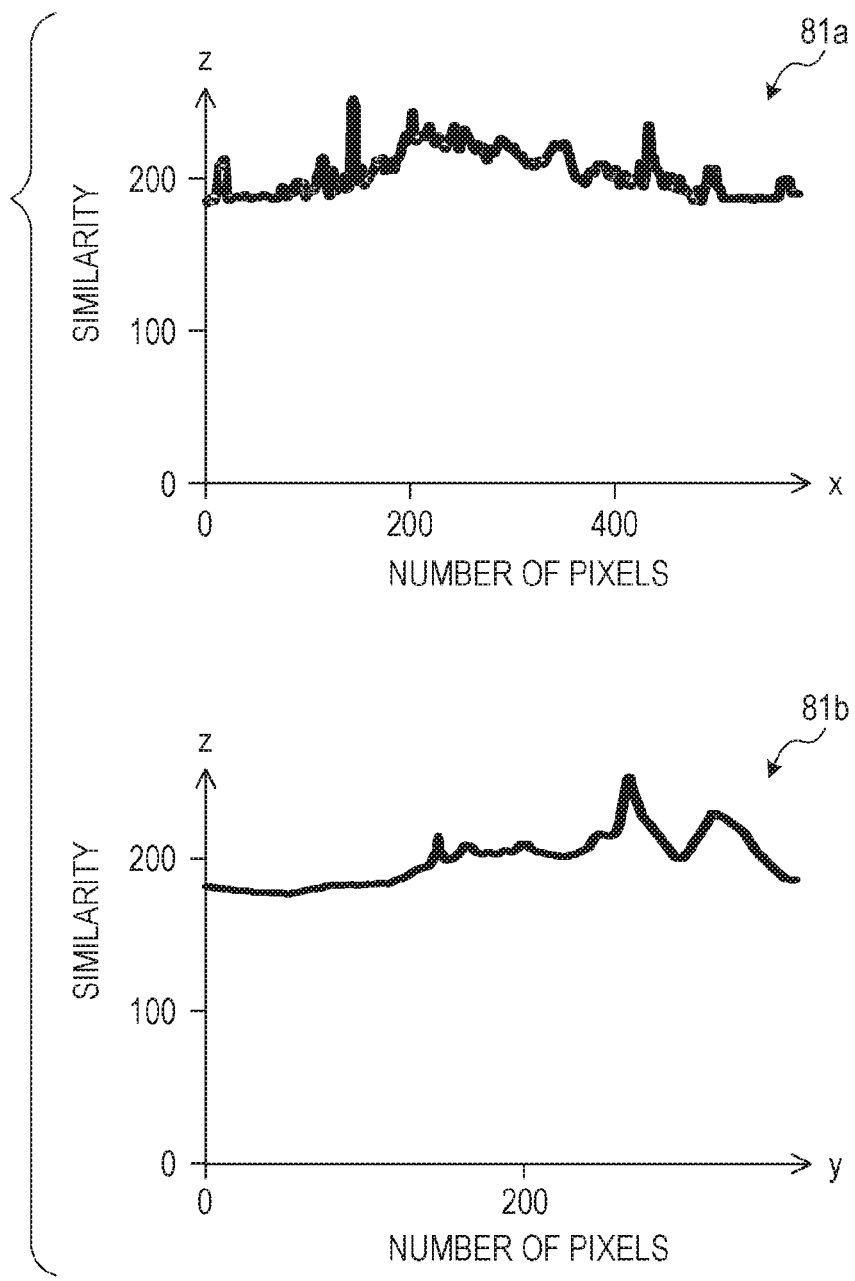
FIG. 7 is a diagram illustrating an example of a similarity map based on a first individual program.
Figure 8:
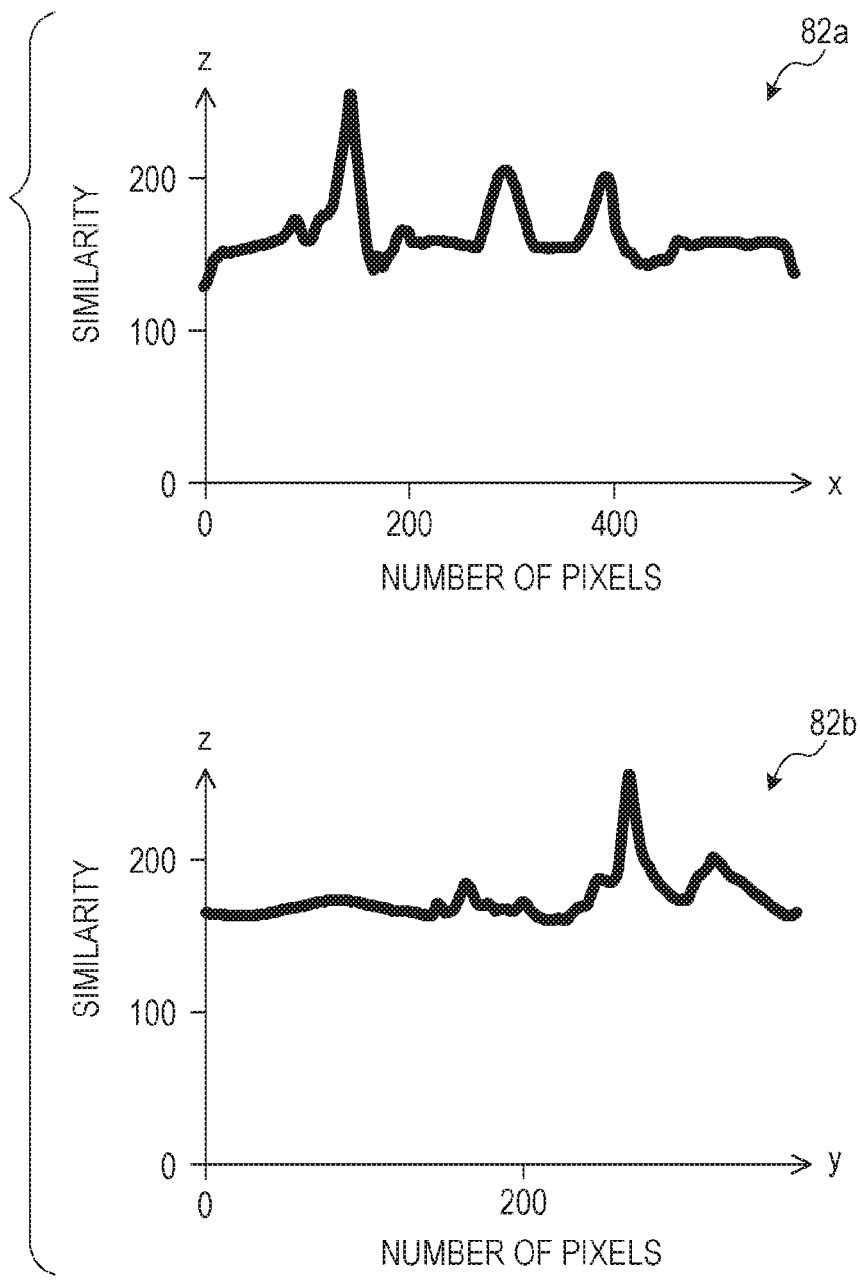
FIG. 8 is a diagram illustrating an example of a similarity map based on a second individual program.

Similarity maps based on two individual programs are illustrated in FIGS. 7 and 8. A similarity map is intermediate data obtained in the middle of processing executed according to an individual program; for each pixel on an input image, FIGS. 7 and 8 plot similarity with a template image calculated for the pixel.

FIG. 7 illustrates a similarity map based on a first individual program example, and FIG. 8 illustrates a similarity map based on a second individual program example. In FIGS. 7 and 8, the x axis indicates pixels in the horizontal direction on the input image, the y axis indicates pixels in the vertical direction on the input image, and the z axis indicates similarity calculated for each pixel. Graphs 81a and 81b in FIG. 7 respectively represent similarity about a horizontal line and a vertical line that include a pixel having a similarity peak on the similarity map based on the first individual program example. Similarly, graphs 82a and 82b in FIG. 8 respectively represent similarity about a horizontal line and a vertical line that include a pixel having a similarity peak on the similarity map based on the second individual program example.

The similarity maps based on the first individual program example and second individual program example have the pixel having a similarity peak at the same position. In this case, if fitness is calculated by the method in which a difference between the matching position and the correct position is calculated as in step S14 in FIG. 4 described above, the fitness of the first individual program example and the fitness of the second individual program are the same, so the first individual program example and the second individual program are evaluated as programs having the same performance. When compared with the graph 82a, however, the graph 81a has much more other similarity peaks close to the maximum similarity at positions besides the position at which the maximum similarity is obtained. When compared with the second individual program example, therefore, the possibility that the first individual program example causes misidentification (that is, recognizes an incorrect template position) is higher and the robustness of the first individual program example is thereby lower.

If the fitness calculated by the method described above is used, although precisions in template matching are evaluated as the same according to the fitness, there may be a difference between these precisions in practice due to a difference in robustness. This is problematic in that it may not be possible at all times to create an image recognizing program having high precision in position detection.

In a possible example of using an image recognizing program created by the procedure described above, image processing is performed on an image obtained by photographing a product to obtain a desired effect in the factory automation (FA) field. To recognize or inspect a product on a manufacturing line, for example, the position of a particular part may be detected from an image obtained by photographing the appearance of a product.

In this usage, it may be desirable to restructure an image recognition algorithm when a product, which is a subject, is changed or improved and the photographing environment is changed due to the change or improvement. Therefore, an easy-to-structure algorithm is desirable. It is desirable to structure an algorithm that is highly robust against changes in the photographing environment, such as changes in lighting conditions, and variations in the shape, position, and posture of a subject.

In the second embodiment, therefore, a highly robust image recognizing program is stably created by changing the fitness calculation method in the comparison example described above. Specifically, similarity in shape between the distribution of a similarity map calculated by executing an individual program and a target distribution of the similarity map is used as fitness.

An image processing apparatus in the second embodiment will be described below.

Figure 9:
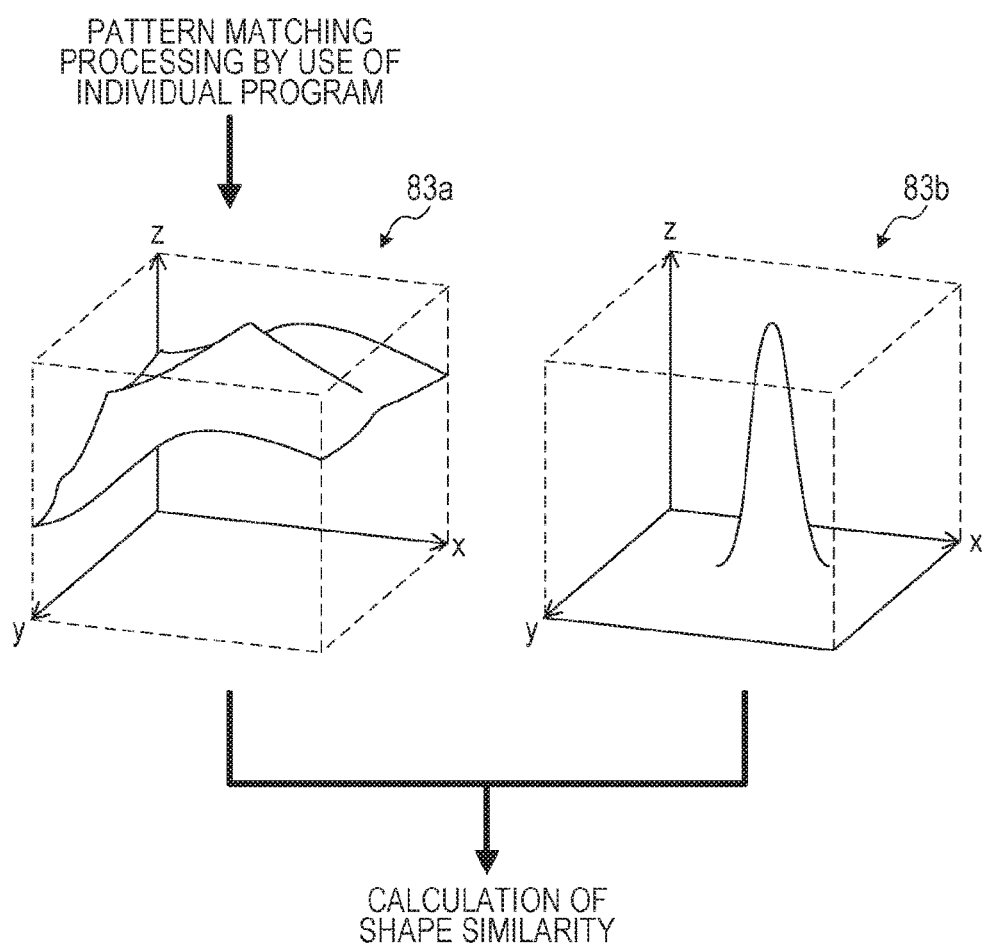
FIG. 9 is a diagram illustrating an example of a comparison in shape between a similarity map distribution and a target distribution, according to an embodiment.

FIG. 9 illustrates an example of a comparison in shape between a similarity map distribution and a target distribution. In a fitness calculation process corresponding to step S14 in FIG. 4, the image processing apparatus in this embodiment executes template matching according to an individual program to obtain a similarity map as intermediate information in the matching processing. A graph 83a in FIG. 9 three-dimensionally indicates the obtained similarity map.

The image processing apparatus compares the distribution of the obtained similarity map with a target similarity map distribution that has been set in advance and calculates similarity in shape as fitness. A graph 83b in FIG. 9 three-dimensionally indicates the target similarity map distribution. As in the example indicated by the graph 83b, the target distribution has a shape in which only one peak appears at the correct position on the template image and the similarity is lowered as the distance from the peak is prolonged. A preferable example of the target distribution is a Gaussian distribution (normal distribution).

If the distribution of a similarity map based on an individual program is close to the target distribution, the possibility that a matching position obtained by template matching processing in which the individual program is used is a position other than the correct position is very low. Therefore, it may be thought that similarity in shape between the target distribution and the distribution of a similarity map based on an individual program indicates a degree of robustness in template matching processing in which the individual program is used. If this similarity in shape is used as fitness, it is possible to increase the possibility that an image recognizing program with high robustness is created.

The target distribution is prepared in advance according to, for example, a calculation equation. Alternatively, the target distribution may be appropriately recalculated during the learning process. In this embodiment, the latter method is used as an example. Specifically, each time the individual program group 61 (see FIG. 4) is updated, the target distribution is calculated from a difference between the correct position and the matching position calculated according to each individual program included in the individual program group 61.

Figure 10:
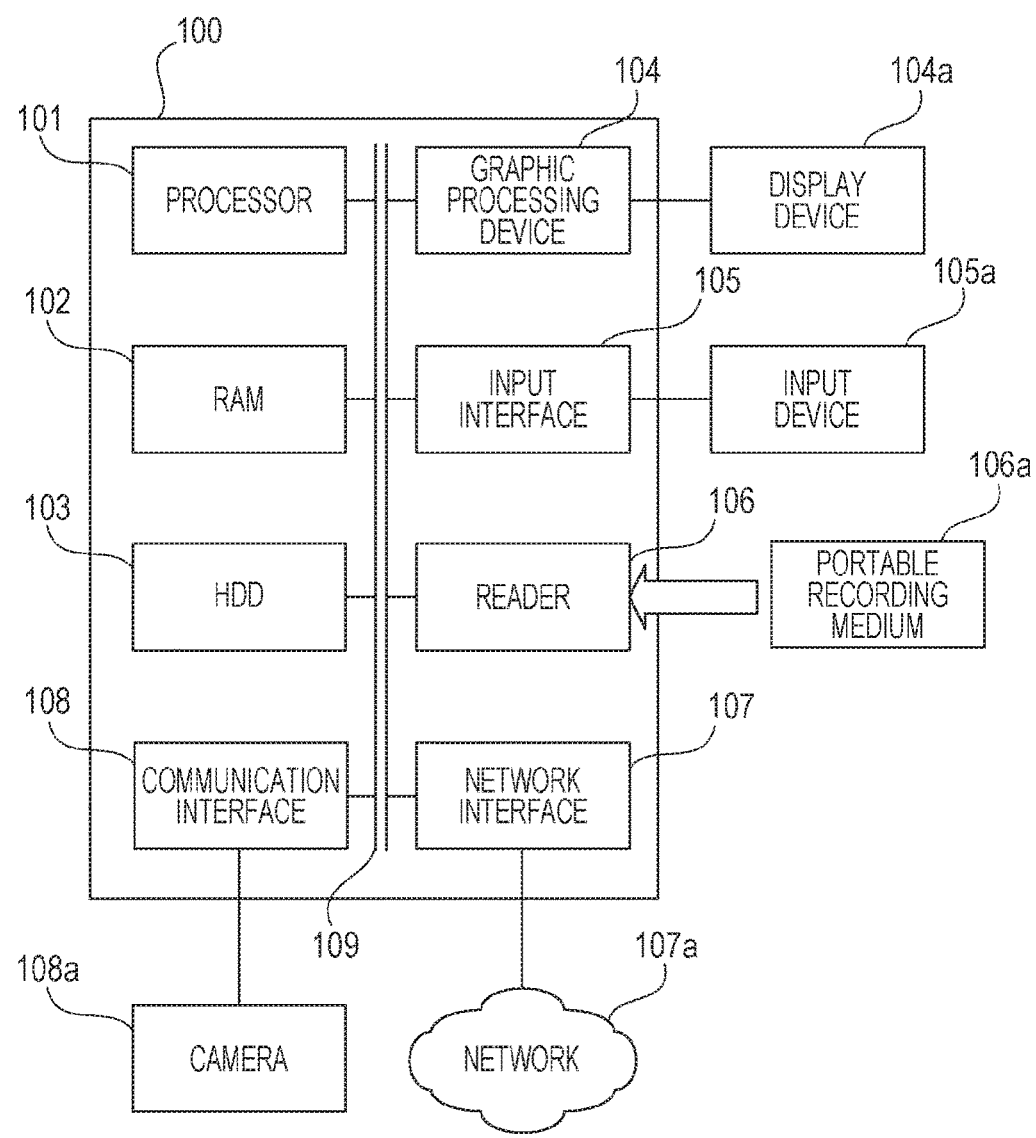
FIG. 10 is a diagram illustrating an example of a hardware configuration of an image processing apparatus, according to an embodiment.

FIG. 10 illustrates an example of the hardware structure of an image processing apparatus. An image processing apparatus 100 is implemented as, for example, a computer as illustrated in FIG. 10.

The whole of the image processing apparatus 100 is controlled by a processor 101. The processor 101 may be a multi-processor. The processor 101 is, for example, a central processing unit (CPU), a micro processing unit (MPU), a digital signal processor (DSP), an application-specific integrated circuit (ASIC), or a programmable logic device (PLD). The processor 101 may be a combination of two or more elements of the CPU, MPU, DSP, ASIC, and PLD.

The processor 101 is connected to a random-access memory (RAM) 102 and a plurality of peripheral devices through a bus 109.

The RAM 102 is used as a main storage device of the image processing apparatus 100. The RAM 102 temporarily stores at least part of an operating system (OS) and an application program that will be executed by the processor 101. The RAM 102 also stores various types of data used in processing executed by the processor 101.

Peripheral devices connected to the bus 109 includes a hard disk drive (HDD) 103, a graphic processing device 104, an input interface 105, a reader 106, a network interface 107, and a communication interface 108.

The HDD 103 is used as an auxiliary storage device of the image processing apparatus 100. The HDD 103 stores the OS, application programs, and various types of data. A solid-state drive (SSD) or another type of non-volatile storage device may also be used as the auxiliary storage device.

A display device 104a is connected to the graphic processing device 104. The graphic processing device 104 displays an image on the screen of the display device 104a in response to a command from the processor 101. Examples of the display device 104a include a liquid crystal display device and an organic electroluminescence (EL) display device.

An input device 105a is connected to the input interface 105. The input interface 105 receives a signal output from the input device 105a and sends the signal to the processor 101. Examples of the input device 105a include a keyboard and a pointing device. Examples of the pointing device include a mouse, a touch panel, a tablet, a touchpad, and a trackball.

A portable recording medium 106a is removably attached to the reader 106. The reader 106 reads data recorded on the portable recording medium 106a and sends the data to the processor 101. Examples of the portable recording medium 106a include an optical disc, a magneto-optical disc, and a semiconductor memory.

The network interface 107 transmits data to and receives data from other devices through a network 107a.

The communication interface 108 transmits data to and receives data from external devices connected to the communication interface 108. In this embodiment, a camera 108a is connected to the communication interface 108 as an external device. The communication interface 108 receives image data transmitted from the camera 108a and sends the image data to the processor 101.

Processing functions of the image processing apparatus 100 may be implemented by the hardware structure described above.

Figure 11:
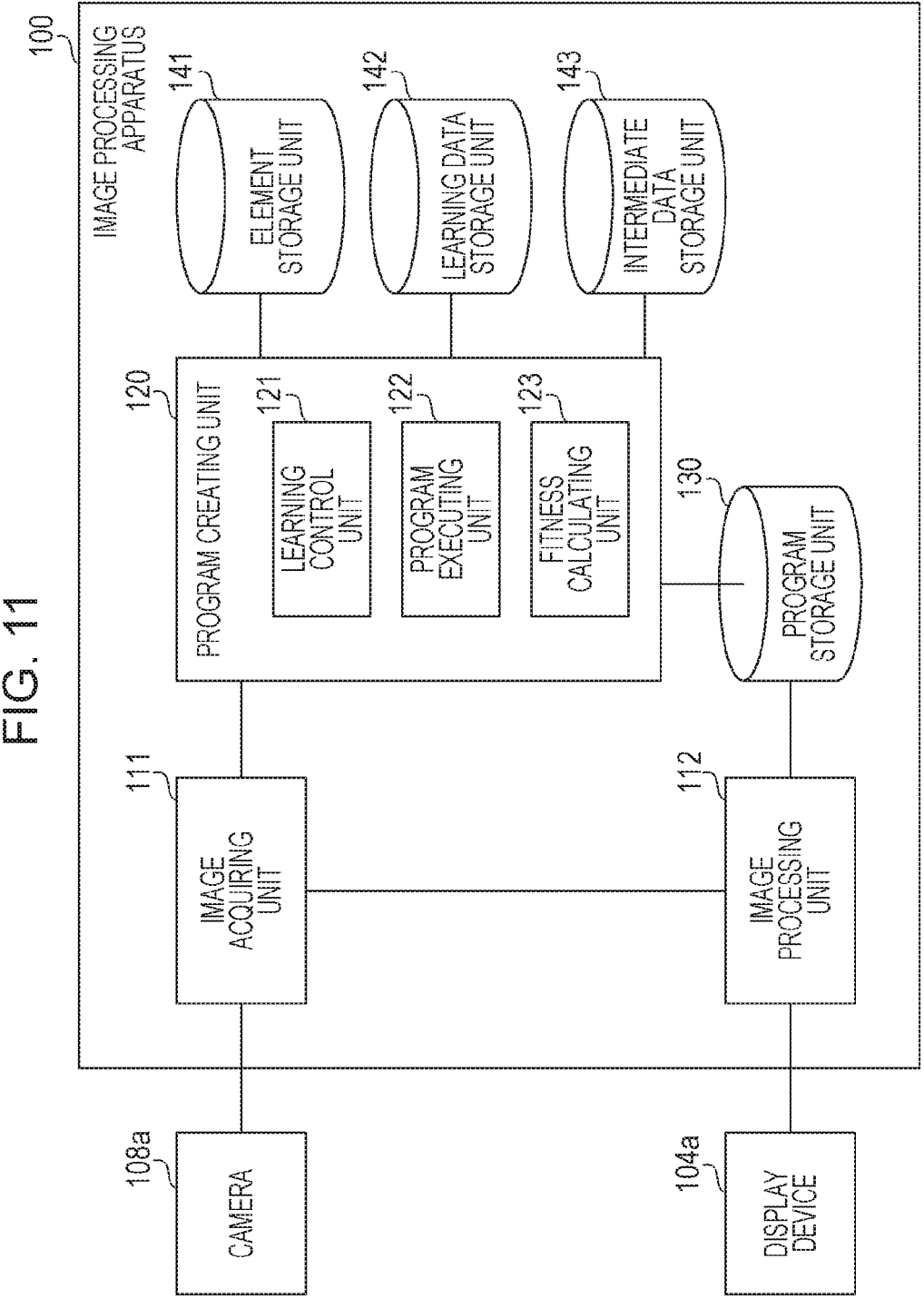
FIG. 11 is a diagram illustrating an example of a configuration of processing functions included in an image processing apparatus, according to an embodiment.

FIG. 11 is a block diagram illustrating an example of the structure of processing functions included in the image processing apparatus. The image processing apparatus 100 has processing functions similar to the processing functions of the program creating apparatus 10 illustrated in FIG. 1 as well as functions that execute an image recognizing program created by the processing functions to perform image processing. The image processing apparatus 100 includes an image acquiring unit 111, an image processing unit 112, a program creating unit 120, a program storage unit 130, an element storage unit 141, a learning data storage unit 142, and an intermediate data storage unit 143.

Processing executed by the image acquiring unit 111, image processing unit 112, and program creating unit 120 is implemented, for example, by causing the processor 101 in the image processing apparatus 100 to execute a prescribed program. Part of processing executed by the image processing unit 112 is implemented by causing the processor 101 in the image processing apparatus 100 to execute an image recognizing program stored in the program storage unit 130. The program storage unit 130, element storage unit 141, and learning data storage unit 142 are implemented as, for example, storage areas in the HDD 103 in the image processing apparatus 100. The intermediate data storage unit 143 is implemented as, for example, a storage area in the RAM 102 in the image processing apparatus 100.

The image acquiring unit 111 acquires data of a captured image from the camera 108a and outputs the data to the program creating unit 120 or image processing unit 112.

The program creating unit 120 creates an image recognizing program by genetic programming and stores the created image recognizing program in the program storage unit 130. The internal structure of the program creating unit 120 will be described later.

The image processing unit 112 acquires the data of an image captured by the camera 108a, through the image acquiring unit 111. The image processing unit 112 uses the acquired image data to perform template matching processing according to the image recognizing program stored in the program storage unit 130, and outputs the position of the template image on the image.

The program storage unit 130 stores the image recognizing program created by the program creating unit 120.

The element storage unit 141 stores the data of elements that are able to be included in individual programs created by the program creating unit 120. These elements are elements indicated in the table 40 in FIG. 3; for example, the elements include various types of image filter programs and programs that execute matching processing.

The learning data storage unit 142 stores at least one set of learning data that includes an input image and the correct position of a template image on the input image. The input image included in the learning data may be, for example, an image captured by the camera 108a connected to the image processing apparatus 100. The learning data storage unit 142 also stores the template image on which to perform matching processing.

The intermediate data storage unit 143 temporarily stores various types of data created during processing executed by the program creating unit 120. The intermediate data storage unit 143 stores, for example, individual programs created by combining elements stored in the element storage unit 141, data of positions and similarity maps that is obtained as a result of executing individual programs, various types of data used in calculation of fitness, and data of fitness calculated for individual programs.

The program creating unit 120 includes a learning control unit 121, a program executing unit 122, and a fitness calculating unit 123.

The learning control unit 121 controls the whole of program creation processing executed by the program creating unit 120 in an integrated manner. The learning control unit 121 creates initial individual programs, performs evolution processing on individual programs, selects an individual program to be left for survival according to fitness, outputs a final image recognizing program, updates an individual program group by including the individual program selected for survival, and performs other processing.

The program executing unit 122 executes an individual program in response to a command from the learning control unit 121. As a result of executing the individual program, the program executing unit 122 detects the position of the template image on the input image and outputs a similarity map created during the processing as the need arises.

The fitness calculating unit 123 calculates fitness according to which each individual program is evaluated, in response to a command from the learning control unit 121. Fitness includes positional fitness, similarity in shape, and total fitness as described later in detail. The fitness calculating unit 123 also calculates data such as a target distribution used in fitness calculation.

Figure 12:
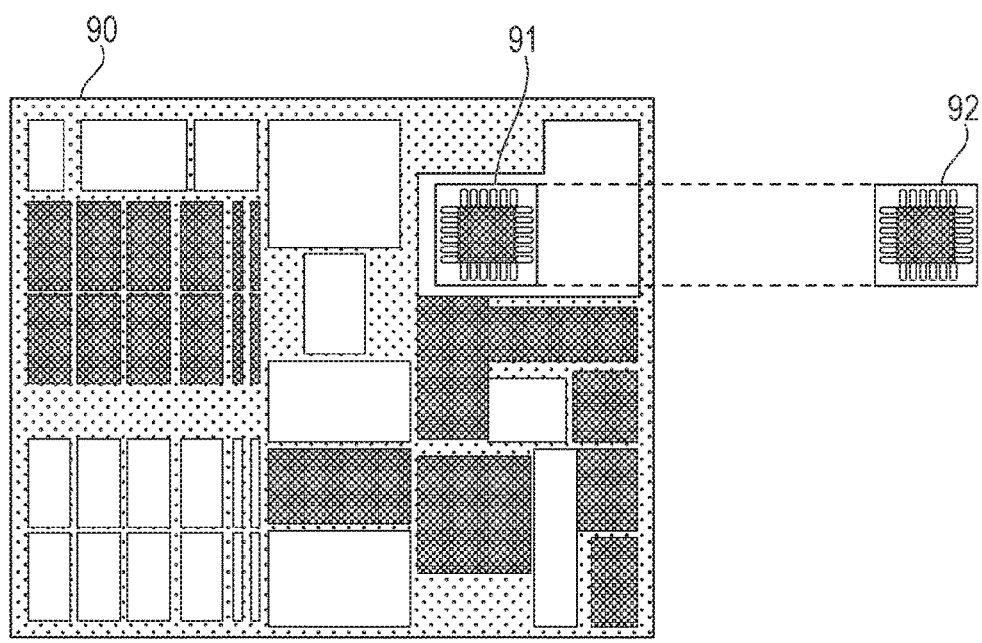
FIG. 12 is a diagram illustrating an example of creating a template image, according to an embodiment.

FIG. 12 illustrates an example of creating a template image. The manager of the image processing apparatus 100 causes the camera 108a to capture, for example, an image 90 on which a target part 91 is included. A template image 92 may be created by cutting out the target part 91 from the image 90. The image 90 may also be used as an input image of learning data.

Figure 13:
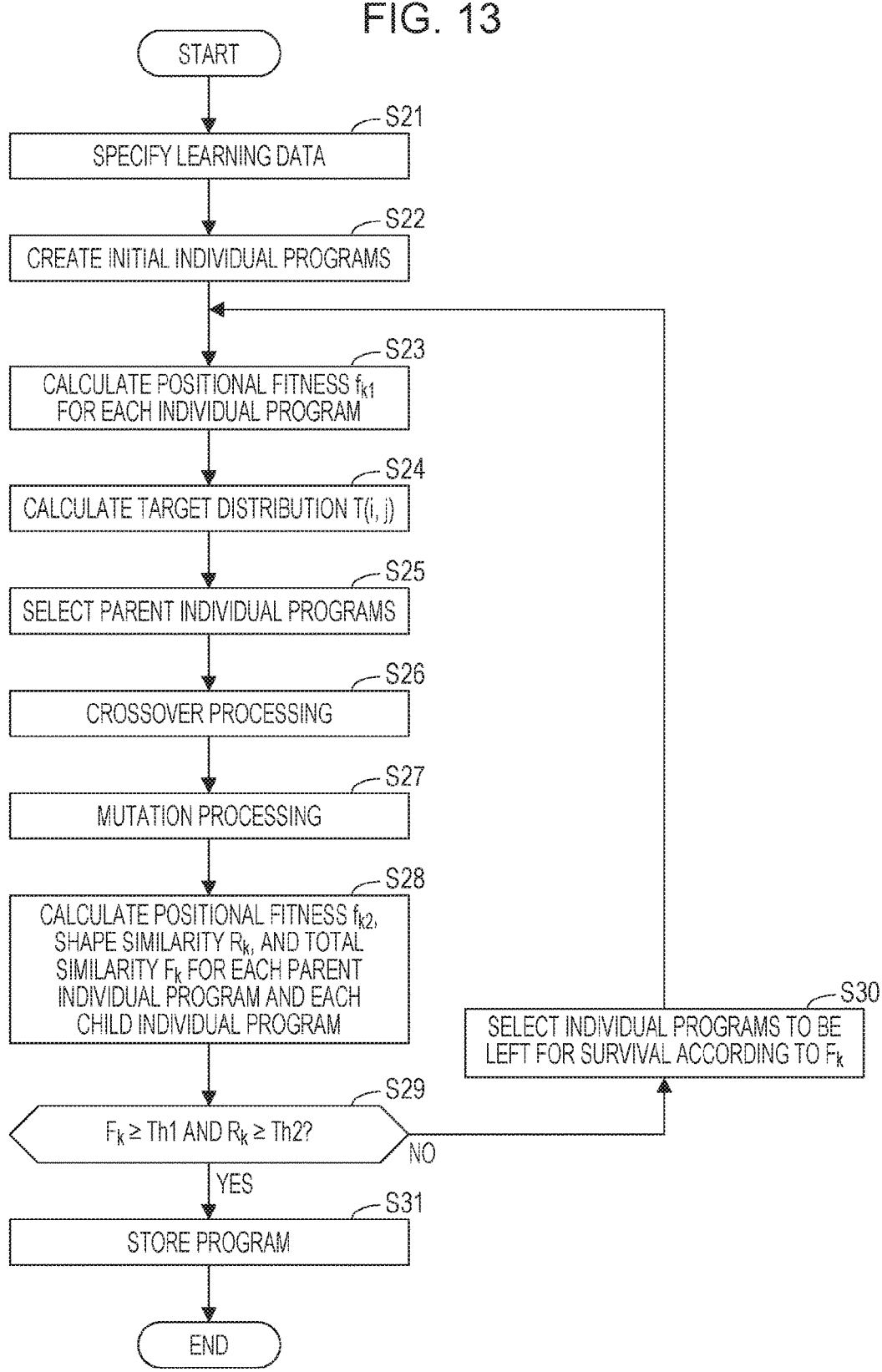
FIG. 13 is a diagram illustrating an example of an operational flowchart for a program creation processing procedure, according to an embodiment.

Next, processing to create an image recognizing program in the image processing apparatus 100 will be described by using a flowchart. FIG. 13 is an operational flowchart illustrating an example of a program creation processing procedure.

Step S21: The learning control unit 121 accepts an input manipulation performed to specify learning data. For example, leaning data used in this processing is specified from learning data stored in the learning data storage unit 142.

Step S22: The learning control unit 121 creates a plurality of initial individual programs by combining elements stored in the element storage unit 141 and stores the created initial individual programs in the intermediate data storage unit 143. An individual program group created in this processing is equivalent to the individual program group 61 illustrated in FIG. 3, so the individual program group will be referred to below as the individual program group 61.

Step S23: Positional fitness $f_{k1}$ is calculated for each individual program included in the individual program group 61 by a procedure as described below. The learning control unit 121 selects one individual program from the individual program group 61 and causes the program executing unit 122 to execute the selected individual program. The program executing unit 122 calculates the position (mapping position) of the template image on the input image included in the learning data specified in step S21. The learning control unit 121 commands the fitness calculating unit 123 to calculate positional fitness $f_{k1}$ by notifying the fitness calculating unit 123 of the mapping position calculated by the program executing unit 122 and the correct position included in the learning data specified in step S21. The fitness calculating unit 123 calculates a difference $d_k$ between the matching position and the correct position and calculates positional fitness $f_{k1}$ according to equation (1) below.

$$f_{k1} = \exp\left(-\frac{d_k^2}{2\sigma^2}\right) \quad (1)$$

In equation (1), $\sigma$ is a parameter that is set in advance according to intended position detection precision.

When the above processing is executed for all individual programs included in the individual program group 61 under control of the learning control unit 121, positional fitness $f_{k1}$ is calculated for all individual programs. When positional fitness $f_{k1}$ has been already calculated for an individual program included in the individual program group 61 in previous execution of step S23, calculation of positional fitness $f_{k1}$ for the individual program in step S23 may be skipped.

Step S24: The learning control unit 121 commands the fitness calculating unit 123 to calculate target distribution T(i, j). The fitness calculating unit 123 calculates target distribution T(i, j) according to equation (2) below.

$$T(i, j) = \exp\left(-\frac{i^2 + j^2}{2\delta^2} ave(f_{k1})^2\right) \quad (2)$$

In equation (2), i and j indicate the coordinates of a pixel on the input image, ave $(f_{k1})^2$ is the average of positional fitness $f_{k1}$ in step S23 for all individual programs included in the individual program group 61, and δ is an adjustment parameter for learning.

The learning control unit 121 stores calculated target distribution T(i, j) in the intermediate data storage unit 143. When target distribution T(i, j) calculated in previous execution of step S24 has been already stored in the intermediate data storage unit 143, the learning control unit 121 updates stored target distribution T(i, j) with newly calculated target distribution T(i, j).

Step S25: The learning control unit 121 randomly selects two parent individual programs from among the individual programs included in the individual program group 61.

Step S26: The learning control unit 121 makes a crossover between the two selected parent individual programs to create a certain number of child individual programs, which is equal to or larger than 2.

[Step S27] The learning control unit 121 causes a mutation in any one of the nodes of the created child individual programs and replaces the image filter included in the node of the previous individual program with any one of other image filters stored in the element storage unit 141.

Step S28: Positional fitness $f_{k2}$, shape similarity $R_k$, and total similarity $F_k$ are calculated for each parent individual program selected in step S25 and each child individual program obtained in processing in steps S26 and S27. In step S28, processing described below is performed on each individual program undergoing calculation.

The learning control unit 121 causes the program executing unit 122 to execute each individual program undergoing calculation so that the individual program calculates a matching position. The learning control unit 121 acquires similarity map I(i, j) obtained for each individual program during the calculation process.

The learning control unit 121 causes the fitness calculating unit 123 to calculate positional fitness $f_{k2}$ for each individual program according to the calculated matching position. Positional fitness $f_{k2}$ is calculated according to equation (1) above, in which difference $d_k$ between the matching position and the correct position for each individual program is used. In the description given here, positional fitness $f_{k2}$ calculated in step S28 is represented so as to be distinguished from positional fitness $f_{k1}$ calculated in step S23. Since positional fitness $f_{k2}$ for the parent individual program has been already calculated in step S23, the calculation thereof in step S28 may be skipped.

The learning control unit 121 causes the fitness calculating unit 123 to calculate shape similarity $R_k$ for each individual program. The fitness calculating unit 123 calculates shape similarity $R_k$ for each individual program according to equation (3) below.

$$R_k = \frac{\sum\{(I(i,j) - I_{ave})(T(i,j) - T_{ave})\}}{\sqrt{\sum(I(i,j) - I_{ave})^2 \times \sum(T(i,j) - T_{ave})^2}} \quad (3)$$

In equation (3), I(i, j) indicates a similarity map obtained by executing the corresponding individual program, Iave indicates the average of similarities on the similarity map I(i, j), T(i, j) indicates the target distribution calculated in step S24, and Tave indicates the average of similarities on the target distribution T(i, j). Shape similarity $R_k$ calculated according to equation (3) indicates similarity in shape between the distribution of similarity map I(i, j) for the corresponding individual program and target distribution T(i, j).

The learning control unit 121 causes the fitness calculating unit 123 to calculate total similarity $F_k$ for each individual program. According to equation (4) below, the fitness calculating unit 123 calculates, for each individual program, total similarity $F_k$ from positional fitness $f_{k2}$ and shape similarity $R_k$ corresponding to the individual program.

$$F_k = R_k \times f_{k2} \quad (4)$$

Step S29: The learning control unit 121 determines whether the parent individual programs selected in step S25 and the child individual programs obtained in processing in steps S26 and S27 include an individual program that satisfies the condition that total similarity $F_k$ is equal to or greater than a prescribed threshold Th1 and shape similarity $R_k$ is equal to or greater than a prescribed threshold Th2. When an individual program satisfying the condition is included, processing in step S31 is executed. When such an individual program is not included, processing in step S30 is executed.

Step S30: The learning control unit 121 selects the individual program for which total similarity $F_k$ is maximized, as the individual program to be left for survival, from among the parent individual programs selected in step S25 and the child individual programs obtained in processing in steps S26 and S27. The learning control unit 121 further selects one individual program to be left for survival, from among the remaining individual programs. In this selection processing, an individual program is selected, for example, at a probability that matches calculated total similarity $F_k$.

The learning control unit 121 replaces the parent individual programs, selected in step S25, in the individual program group 61 with the two individual program selected in step S30. This updates the generation of the individual program group 61.

Step S31: The learning control unit 121 stores, in the program storage unit 130, the image recognizing program indicated by the individual program that satisfies the condition in step S29, and terminating the processing. When there are a plurality of individual programs that satisfy the condition in step S29, the learning control unit 121 stores, in the program storage unit 130, the image recognizing program indicated by, for example, the individual program for which total similarity $F_k$ is maximized.

In the processing in FIG. 13, target distribution T(i, j) is calculated in step S24 according to positional fitness $f_{k1}$ for each individual program included in the individual program group 61. Target distribution T(i, j) is a normal distribution having a peak at the correct position. In step S28, positional fitness $f_{k2}$ obtained in the evolution process for each individual program and shape similarity $R_k$, which indicates a degree of similarity in shape between the distribution of similarity map I(i, j) for the individual programs and the target distribution T(i, j), are calculated.

In step S30, individual programs to be left in a next generation are selected according to an index obtained in consideration of positional fitness $f_{k2}$ and shape similarity $R_k$. In the individual program group 61, therefore, many individual programs are left that have robustness improved in that a matching result is close to the correct position and the shape of similarity map I(i, j) is close to the shape of target distribution T(i, j)

In step S29 as well, an individual program to be output as a final image recognizing program is determined according to an index obtained in consideration of positional fitness $f_{k2}$ and shape similarity $R_k$. In particular, since, in step S29, shape similarity $R_k$ is compared directly with a threshold, a determination is made by considering shape similarity $R_k$ to be more important than in step S30, so an individual program with high robustness is reliably selected as an image recognizing program to be output.

As described above, each time the individual program group 61 is updated, the individual program group 61 includes more individual programs for which the shape of similarity map I(i, j) is close to the shape of target distribution T(i, j). Therefore, the shape of target distribution T(i, j) calculated in step S24 gradually changes as illustrated in FIG. 14.

Figure 14:
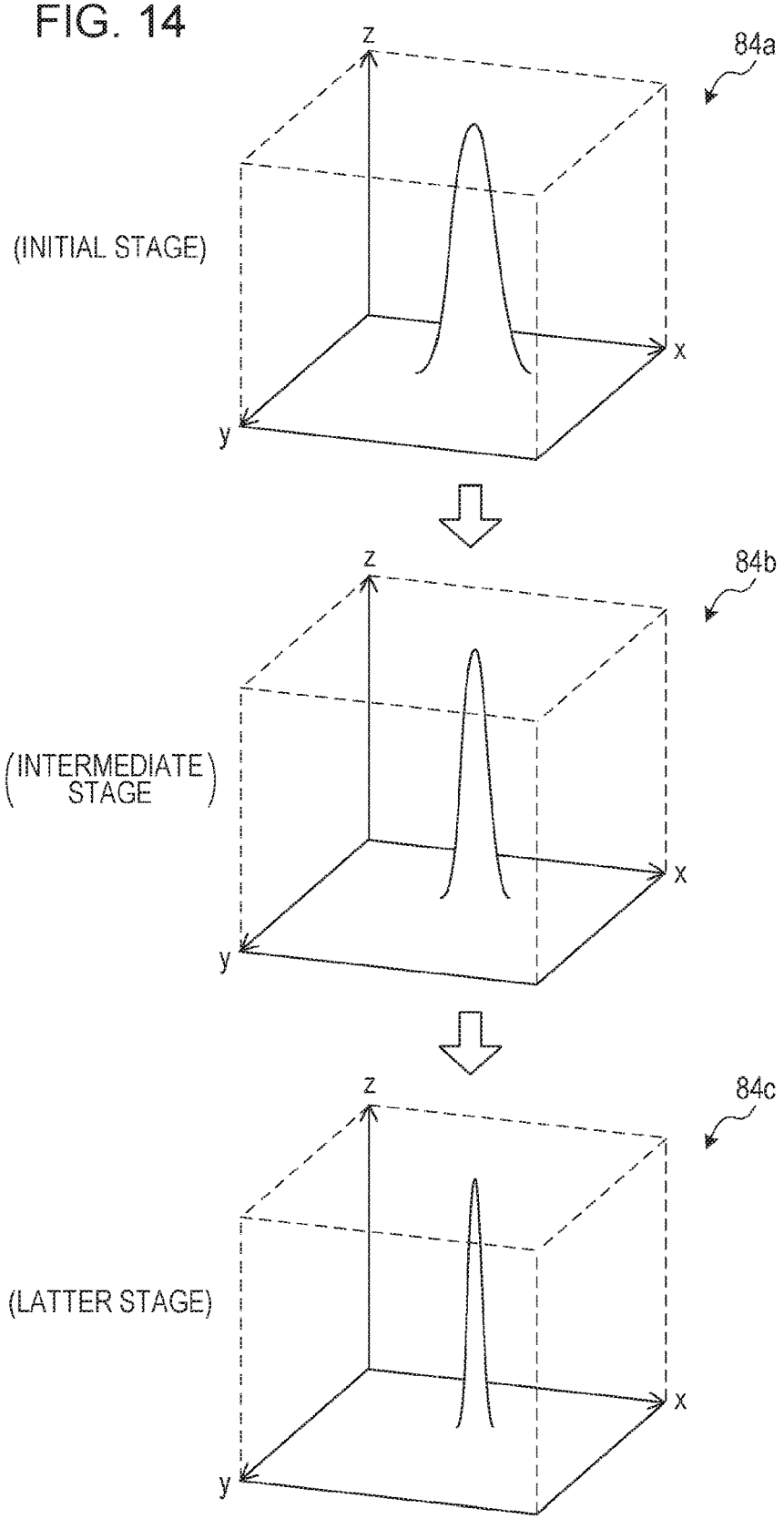
FIG. 14 is a diagram illustrates an example of changes in a shape of a target distribution, according to an embodiment.

FIG. 14 illustrates an example of changes in the shape of a target distribution. Graphs 84a, 84b, and 84c are examples of target distribution T(i, j) created respectively at an initial stage, an intermediate stage, and a latter stage after the start of the processing in FIG. 13. As in the example in FIG. 14, the shape of the target distribution T(i, j) gradually changes in a way that inclinations around the correct position are steepened as processing proceeds.

When the inclinations of target distribution T(i, j) are not so steep as indicated by the graph 84a, the individual program is evaluated with an emphasis on robustness, not on the correctness of the matching position. As the inclinations of the target distribution T(i, j) are gradually steepened, the correctness of the matching position is increased near the correct position. In this processing, it is possible to finally create an image recognizing program that has high robustness and assures high correctness for the matching position.

Figure 15:
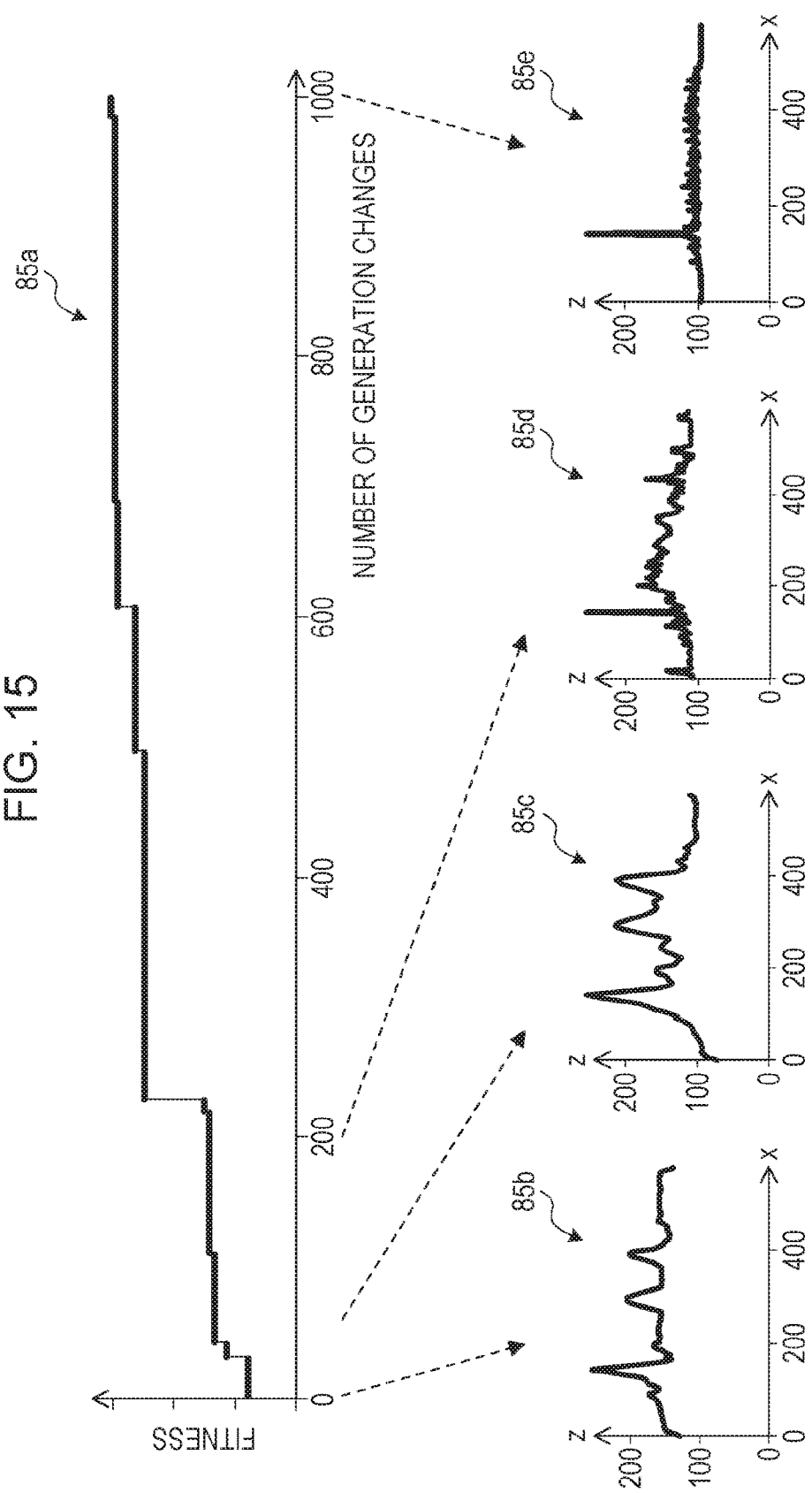
FIG. 15 is a diagram illustrating a relationship among the number of generation changes, fitness, and a similarity map, according to an embodiment.

FIG. 15 illustrates a relationship among the number of generation changes, fitness, and a similarity map. A graph 85a indicates an example of a relationship between fitness and the number of generation changes. Fitness is positional fitness $f_{k2}$. Graphs 85b, 85c, 85d, and 85e respectively indicate examples of similarity maps for individual programs in a first generation, a several tenth generation, a 200th generation, and a 1000th generation. The graphs 85b, 85c, 85d, and 85e each indicate data, on the similarity map, that is present on a horizontal line passing the correct position.

As seen from the graphs 85b, 85c, 85d, and 85e, at an initial stage of learning, the distribution shape of the similarity map changes in a way that a difference between similarity around the correct position and similarity in other areas is increased. As a result, peaks present at distances from the correct position gradually disappear and performance changes toward higher robustness. When learning proceeds to a certain extent, inclinations around peaks steepened and similarity only at the correct position is outstandingly increased. Thus, matching position correctness around the correct position becomes high.

In the second embodiment described above, target distribution T(i, j) is dynamically calculated according to posi-
tional fitness $f_{k1}$ for each individual program included in the individual program group 61. However, target distribution T(i, j) may be given in a fixed manner. Alternatively, a plurality of target distributions T(i, j) having differently steepened inclinations may be prepared and, as learning proceeds, target distribution T(i, j) having steepened inclinations may be selected as the target distribution T(i, j) to be used.

Third Embodiment

In a third embodiment, an example in which the second embodiment is changed so that an image recognizing program that recognizes a facial image is created. The basic structure of an image processing apparatus according to the third embodiment is the same as in the second embodiment, so the third embodiment will be described by using the reference characters in the second embodiment.

Figure 16:
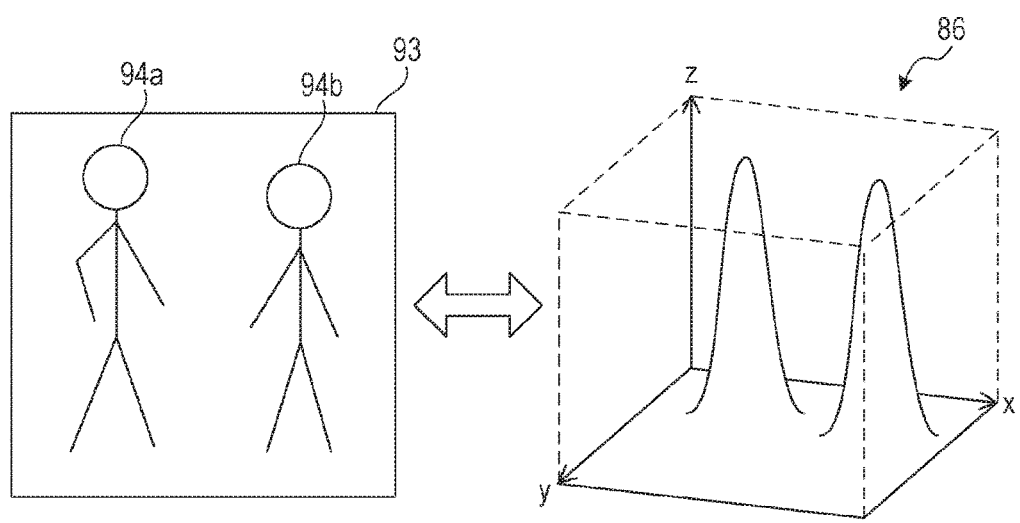
FIG. 16 is a diagram illustrating an example of an input image and a target distribution, according to an embodiment.

FIG. 16 illustrates an example of an input image and an example of a target distribution. An image 93 illustrated in FIG. 16 is an example of an input image, which includes two faces 94a and 94b. An image recognizing program executes template matching processing in which a facial template image is used. As a facial template image, an average image created from many facial images is used.

An image recognizing program created in the third embodiment is a program that outputs two matching positions. In an individual program created in the third embodiment, the partial program M (see FIG. 2), which executes matching processing, outputs, for example, the coordinates at which similarity is maximized and the coordinates at which similarity is the second largest as matching positions. Learning data includes an input image and two correct positions of the two faces.

A graph 86 is an example of target distribution T(i, j) used in the third embodiment. As in the example of the graph 86, target distribution T(i, j) having a peak at the correct position of each face is used in this embodiment.

Figure 17:
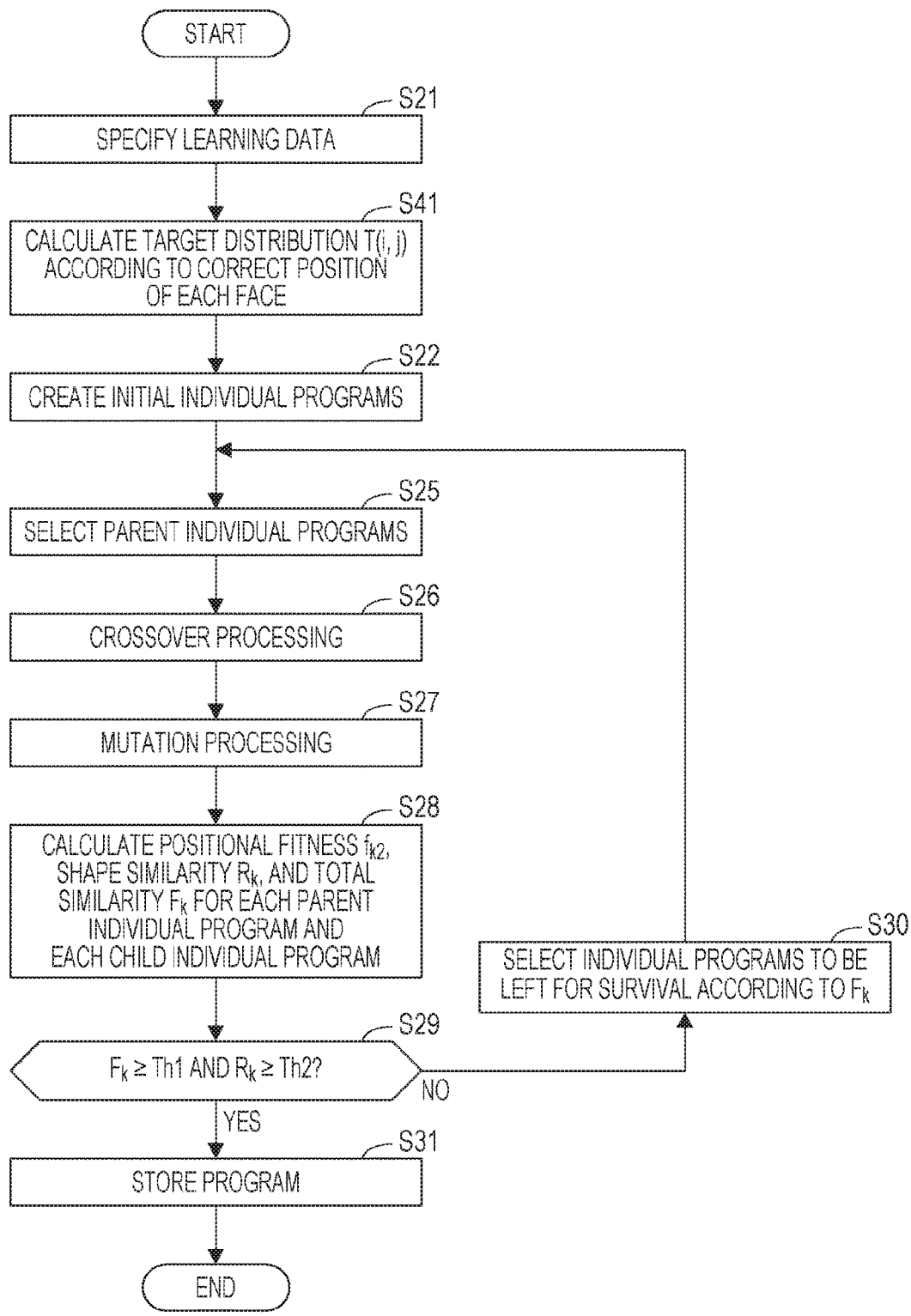
FIG. 17 is a diagram illustrating an example of an operational flowchart for a program creation processing procedure, according to an embodiment.

FIG. 17 is an operational flowchart illustrating an example of a program creation processing procedure in the third embodiment. In FIG. 17, processing steps in which the same processing as in FIG. 13 is executed are assigned the same step numbers and description of these steps will be omitted.

In processing in FIG. 17, step S41 is executed after step S21.

Step S41: The learning control unit 121 commands the fitness calculating unit 123 to calculate target distribution T(i, j). The fitness calculating unit 123 calculates target distribution T(i, j) having a peak at the correct position of each face. For example, the fitness calculating unit 123 calculates target distribution T(i, j) according to equation (5) below, in which the correct position of each face is used.

$$T(i, j) = \sum_{i=0}^{n} \exp\left(-\frac{(i - x_t)^2 + (j - y_t)^2}{2\delta^2}\right) \quad (5)$$

In equation (5), $x_t$ and $y_t$ are respectively the x coordinate and y coordinate of the correct position of a t-th face. Target distribution T(i, j) calculated according to equation (5) is a distribution obtained by combing normal distributions each of which has a peak at the correct positions of a face.

Step S22 is executed after step S41 and processing in step S25 and later is then executed. However, positional fitness $f_{k2}$ calculated in step S28 is calculated as described, for example, below. Two matching positions are calculated for each individual program undergoing calculation by executing the individual program. For each individual program, the fitness calculating unit 123 uses two combinations each of which includes a matching position and its correct position to calculate two positional fitness values according to equation (1). The fitness calculating unit 123 takes the sum or average of the two calculated positional fitness values as positional fitness $f_{k2}$ for the individual program.

In the third embodiment described above, it is possible to create an image recognizing program having high robustness.

The processing functions of the apparatuses in the above embodiments (program creating apparatus 10 and image processing apparatus 100) may be implemented by a computer. In this case, programs in which processing executed by functions to be provided for the apparatuses is coded are supplied. When these programs are executed by the computer, the processing functions are implemented on the computer. The programs in which processing is coded may be recorded in advance on a computer-readable recording medium. Examples of computer-readable recording media include a magnetic recording medium, an optical disc, a magneto-optical recording medium, and a semiconductor memory. Examples of magnetic recording media include a hard disk (HD), a flexible disk (FD), and a magnetic tape. Examples of optical discs include a digital versatile disc (DVD), DVD-RAM, a compact disc-read-only memory (CD-ROM), and a CD-recordable (CD-R) and CD-rewritable (CD-RW). Examples of magneto-optical recording media include a magneto-optical disk (MO).

To place programs on the market, a DVD, CD-ROM, or another type of transportable recording medium on which the programs have been recorded is sold. It is also possible to store the programs in a storage unit of a server computer and transfer the programs from the server computer through a network to another computer.

Programs recorded on the transportable recording medium or transferred from the server computer, for example, are supplied to a computer intended to execute the programs. The computer stores the supplied programs in its storage unit. The computer reads the programs from the storage unit and executes processing according to the programs. The computer may also read the programs directly from the transportable recording medium and may execute processing according to the programs. It is also possible that each time a program is transferred from the server computer connected through a network, the computer receives the program and executes processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for creating a program by genetic programming, the apparatus comprising:
    a memory configured to store a plurality of sub programs, which are combinable constituent elements of an image recognizing program to detect a position of a template image on an input image; and
    a processor coupled to the memory, configured to:
        create a plurality of programs, the plurality of programs respectively being a combination of at least two of the plurality of sub programs;
        calculate similarity maps, for at least two programs among the plurality of programs, by calculating similarity values for respective pixels of the input image with respect to the template image using the at least two programs;
        perform a fitness calculation process to calculate fitnesses, for the at least two programs, based on positional fitnesses and shape fitnesses;
        select, from among the at least two programs, a program for which the fitness, among the fitnesses for the at least two programs, is equal to or greater than a threshold; and
        output the selected program as the image recognizing program,
    wherein a positional fitness, among the positional fitnesses, is calculated based on a difference between a target position of one of the similarity maps and an obtained position of the template image on the input image, and
    a shape fitness, among the shape fitnesses, is calculated based on a similarity in a shape of a distribution of the similarity values of the one of the similarity maps and a shape of a target distribution.

2. The apparatus of claim 1, wherein
the target distribution has a shape in which a peak is formed at the obtained position of the template image on the input image and a value of similarity is lowered as a distance from the peak is prolonged.

3. The apparatus of claim 1, wherein:
the processor further
    creates a plurality of first programs, each of which is a combination of at least two of the plurality of sub programs, and stores the plurality of first programs in the memory;
    selects a certain number of second programs from among the plurality of first programs; and
    outputs a plurality of third programs created from the certain number of second programs, each third program including at least a program created by performing evolution processing on one of the certain number of second programs; and
the fitness calculation process includes calculating fitnesses for each of the plurality of third programs.

4. The apparatus of claim 3, wherein,
when the plurality of third programs includes no program for which the fitness is equal to or greater than the threshold, the processor
    selects, based on the fitnesses, a program to be left for survival from among the plurality of third programs, and
    replaces part of the plurality of first programs stored in the memory with the selected program.

5. The apparatus of claim 4, wherein:
the target distribution is calculated having a shape in which a peak appears at the obtained position of the template image on the input image and a value of similarity is lowered as a distance from the peak is prolonged, based on a result of detection processing executed for each of the plurality of first programs to detect a position of the template image on the input image.

6. The apparatus of claim 5, wherein
the processor further
recalculates the target distribution according to a plurality of fourth programs obtained by replacing the part of the plurality of first programs with the program to be left for survival,
reselects another certain number of second programs from the plurality of fourth programs by using the plurality of fourth programs and the recalculated target distribution,
reoutputs the plurality of third programs created according to the another certain number of second programs,
recalculates the fitnesses for each of the plurality of third programs, and
outputs the image recognizing program according to a result of a comparison between the fitnesses and the threshold.

7. A method for creating a program by genetic programming, the method comprising:
providing a plurality of sub programs, which are combinable constituent elements of an image recognizing program to detect a position of a template image on an input image;
creating a plurality of programs, the plurality of programs respectively being a combination of at least two of the plurality of sub programs;
calculating similarity maps, for at least two programs among the plurality of programs, by calculating similarity values for respective pixels of the input image with respect to the template image using the at least two programs ;
calculating fitnesses, for the at least two programs, based on positional fitnesses and shape fitnesses;
selecting, from among the at least two programs, a program for which the fitness, among the fitnesses for the at least two programs, is equal to or greater than a threshold; and
outputting the selected program as the image recognizing program,
wherein a positional fitness, among the positional fitnesses, is calculated based on a difference between a target position of one of the similarity maps and an obtained position of the template image on the input image, and
a shape fitness, among the shape fitnesses, is calculated based on a similarity in a shape of a distribution of the similarity values of the one of the similarity maps and a shape of a target distribution.

8. A non-transitory, computer-readable recording medium having stored therein a program for causing a computer to execute a process, the process comprising:
providing a plurality of sub programs, which are combinable constituent elements of an image recognizing program to detect a position of a template image on an input image;
creating a plurality of programs, the plurality of programs respectively being a combination of at least two of the plurality of sub programs;
calculating similarity maps, for at least two programs among the plurality of programs, by calculating similarity values for respective pixels of the input image with respect to the template image using the at least two programs;
calculating fitnesses, for the at least two programs, based on positional fitnesses and shape fitnesses;
selecting, from among the at least two programs, a program for which the fitness, among the fitnesses for the at least two programs, is equal to or greater than a threshold; and
outputting the selected program as the image recognizing program,
wherein a positional fitness, among the positional fitnesses, is calculated based on a difference between a target position of one of the similarity maps and an obtained position of the template image on the input image, and
a shape fitness, among the shape fitnesses, is calculated based on a similarity in a shape of a distribution of the similarity values of the one of the similarity maps and a shape of a target distribution.

* * * * *